United States Patent [19]
Ekendahl

[11] Patent Number: 5,976,288
[45] Date of Patent: Nov. 2, 1999

[54] METHOD OF FORMING A MOLDED, MULTI-LAYER STRUCTURE

[76] Inventor: Lars O. Ekendahl, 10 Gunstock Drive, Kingston, Sweden, 03848

[21] Appl. No.: 08/781,205

[22] Filed: Jan. 10, 1997

[51] Int. Cl.$^6$ .......................... B32B 31/04; B32B 31/20; B32B 7/02

[52] U.S. Cl. ..................... 156/78; 156/272.2; 156/275.5; 156/285; 156/307.1

[58] Field of Search ............................... 156/245, 272.5, 156/275.5, 298, 78, 285, 307.1

[56] References Cited

U.S. PATENT DOCUMENTS

| | | |
|---|---|---|
| 3,396,062 | 8/1968 | White . |
| 3,936,565 | 2/1976 | Good . |
| 3,997,383 | 12/1976 | Bieler et al. . |
| 4,256,797 | 3/1981 | Stamper et al. . |
| 4,377,614 | 3/1983 | Alfter et al. . |
| 4,440,824 | 4/1984 | Bonis . |
| 4,490,490 | 12/1984 | Patton, Jr. et al. . |
| 4,684,781 | 8/1987 | Frish et al. . |
| 4,769,109 | 9/1988 | Tellvik et al. . |
| 4,800,129 | 1/1989 | Deak . |
| 4,911,978 | 3/1990 | Tsubone et al. . |
| 4,931,121 | 6/1990 | Raspor et al. . |
| 4,950,522 | 8/1990 | Vogt et al. . |
| 5,049,342 | 9/1991 | Scanlon et al. . |
| 5,151,216 | 9/1992 | Liu . |
| 5,178,964 | 1/1993 | Scola et al. . |
| 5,204,179 | 4/1993 | Baker et al. . |
| 5,215,811 | 6/1993 | Reafler et al. . |
| 5,268,203 | 12/1993 | Batdorf . |
| 5,362,436 | 11/1994 | Wagner . |
| 5,385,781 | 1/1995 | Chundury et al. . |
| 5,437,753 | 8/1995 | Ugolini . |
| 5,455,096 | 10/1995 | Toni et al. . |

FOREIGN PATENT DOCUMENTS

87/04118  7/1987  WIPO .

OTHER PUBLICATIONS

Lars O. Ekendahl, "High Output Radiation at Off-Peak Wavelength–Infrared Heating of Low-Density Thermoplastics", 1993, SAE International, Warrendale, Pa 15095–0001.

*Primary Examiner*—Sam Chuan Yao
*Attorney, Agent, or Firm*—Bourque and Associates, PA

[57] ABSTRACT

A method of forming a molded, multi-layer structure begins with a pre-laminated, multi-layer structure having a thermoplastic substrate layer and a cover layer. One or more optional layers laminated may be provided between the cover layer and substrate layer. Thermoplastic materials are selected having various physical characteristics (e.g. degrees of cross-linking) to produce a molded structure having a desired shape, rigidity, hardness/softness, and other physical properties. All of the multiple layers can be made of thermoplastic materials having the same polymers to allow the molded structure to be recycled into a reusable thermoplastic material. The pre-laminated, multi-layer structure is uniformly heated, by a method which provides heat penetration and absorption substantially throughout the multi-layer structure. During thermoforming, such as with male/female molds or vacuum molds, the thickness and rigidity of the multi-layer structure can be varied. A textured or decorative surface can be pre-formed in the cover layer(s) or formed during the thermoforming process.

18 Claims, 3 Drawing Sheets

METHOD OF FORMING A MOLDED, MULTI-LAYER STRUCTURE

FIELD OF THE INVENTION

The present invention relates to molded, multi-layer structures and in particular, to a method of forming a molded, multi-layer structure from a pre-laminated, multi-layer structure having a thermoplastic substrate layer pre-laminated to a cover layer.

BACKGROUND OF THE INVENTION

Multi-layered structures and materials are commonly used in many industries, such as the automotive and building industries. One common use for multi-layer structures is for automobile headliners, panels and dashboards where multiple layers of thermoplastic and/or other materials are shaped, laminated together and formed into a structure having the desired physical and aesthetic or decorative properties. For example, a cover layer such as cloth, having the desired decorative surface (e.g. texture, grain, color and the like) may be laminated to a substrate having desirable physical characteristics (e.g. shape, strength, rigidity, hardness, softness, surface quality and the like). One or more additional layers may be added to vary the physical and decorative characteristics.

Existing methods for producing such molded, multi-layer structures are inefficient, expensive and limited in the variations of the molded product that can be produced. According to one such existing method, the multiple layers are combined and laminated simultaneously during the thermoforming of the molded, multi-layer structures.

One such method includes injection molding a substrate and applying an adhesive, such as a spray adhesive or adhesive film, to the substrate. The substrate is placed in or on a thermoforming mold, and a heated thermoplastic layer is stretched and vacuum drawn over the substrate, while the substrate is in the mold, until bonded to the substrate. Other methods include adding one or more additional layers between the substrate and cover layer while in the mold and require even more complex equipment and steps of forming and shaping the cover layer so that the additional layers can be applied between the substrate and cover layer.

One significant disadvantage of these existing methods is the complexity of the process. Having to perform the lamination of the multiple layers together and simultaneously with the thermoforming requires complex and expensive machinery, additional chemicals and materials, additional manufacturing time, and close attention to molding temperatures and time so as not to damage the materials being laminated.

Another limitation with existing methods of forming molded, multi-layer structures is in the variations of the product that can be produced. To vary the thickness or rigidity of the multi-layer structure, for example, requires additional layers of material having varying properties and placement of these layers in precise locations with respect to other layers in the mold to accomplish the desired thickness or rigidity of the molded, multi-layer structure. Forming a textured or decorative surface on the cover layer also typically requires additional manufacturing steps and equipment, further increasing manufacturing costs and time. Moreover, the finished product often includes layers of dissimilar materials, adhesives and other additives, resulting in a molded product that is difficult or impossible to recycle.

The complex and inefficient existing methods of laminating simultaneously with the thermoforming process were previously necessary to produce a molded product with the desired shape and appearance. Attempts at pre-laminating the layers prior to thermoforming the multi-layer structure have been unsuccessful because the heating of the pre-laminated structure during thermoforming was ineffective and destructive to the molded product. The heating used in existing thermoforming methods would scorch or burn the outer surfaces of the substrate layers without adequately heating the center of the substrate layer to allow forming of the product. Any textured or decorative surface of the cover layer applied to the substrate would then be damaged during the thermoforming process.

Accordingly, a need exists for a method of forming a molded, multi-layer structure in which a pre-laminated, multi-layer structure having a thermoplastic substrate layer and a cover layer can be used in a thermoforming process to efficiently and quickly, in one step, form a molded, multi-layer structure having any desired shape, thickness, rigidity, texture, appearance, or any other desired physical or decorative characteristic. A method is needed in which a textured or decorative surface can be applied on a cover layer of the multi-layer structure either prior to forming or during the thermoforming process without being damaged by heat during the thermoforming process. A method is also needed in which the thickness and/or hardness/softness of the multi-layer structure can be varied during the thermoforming step. A method is also needed for forming a molded, multi-layer structure that is easily and fully recyclable.

SUMMARY OF THE INVENTION

The present invention features a method of forming a molded, multi-layer structure comprising the steps of: providing a pre-laminated, multi-layer structure having at least one thermoplastic substrate layer pre-laminated to at least one cover layer; heating the pre-laminated, multi-layer structure, for raising a temperature of the pre-laminated, multi-layer structure to a thermoforming temperature substantially homogeneously throughout at least the thermoplastic substrate layer until the thermoplastic substrate layer is in a thermoformable state; and forming the heated pre-laminated multi-layer structure into the molded, multi-layer structure.

Examples of the pre-laminated, multi-layer structure include a thermoplastic substrate layer bonded to the cover layer with an adhesive, or other bonding methods including fusion bonding the thermoplastic substrate layer directly to the cover layer, and co-extruding the thermoplastic substrate layer and the cover layer. The thermoplastic substrate layer and cover layer are preferably made of compatible thermoplastic materials, for example, having the same polymers. The thermoplastic substrate layer is preferably made of a partially cross-linked thermoplastic foam, such as a thermoplastic foam having cross-linking in a range of about 0 to 75%. One example of the thermoplastic substrate layer includes a polyolefin foam. An alternative embodiment of the pre-laminated, multi-layer structure further includes an additional layer between the thermoplastic substrate layer and the cover layer.

The heating of the pre-laminated, multi-layer structure preferably includes heating with infrared radiation at a predetermined wavelength selected to provide heat penetration and absorption substantially uniformly throughout the thermoplastic substrate layer. The infrared radiation is preferably a high output radiation at an off-peak wavelength, for example, in a range 1–2.5 microns or just above maximum absorption, for example, in a range of 3–5 microns, to prevent significant heat absorption in the cover layer. The heating is performed for a period of time sufficient to allow thermoforming, for example, in a range of about 10–100 seconds. The heating of a partially cross-linked thermoplastic foam preferably increases cross-linking in the thermoplastic substrate layer by about 10% to 75%.

One example of forming the heated pre-laminated, multi-layer structure into the molded, multi-layer structure includes placing the heated pre-laminated, multi-layer structure between male and female mold members, and pressing the male and female mold members against the heated pre-laminated, multi-layer structure. Another example of forming the heating pre-laminated, multi-layer structure includes placing the heated pre-laminated, multi-layer structure against a vacuum mold member, and vacuum molding the heated pre-laminated, multi-layer structure. According to various examples, forming the heated pre-laminated, multi-layer structure includes forming the heated pre-laminated, multi-layer structure with at least one region of varying thickness and/or with at least one region of varying hardness, such as a softer region proximate the cover layer.

Further embodiments of the present method include a textured surface pre-formed onto the cover layer or forming a textured surface on the cover layer during the forming step.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
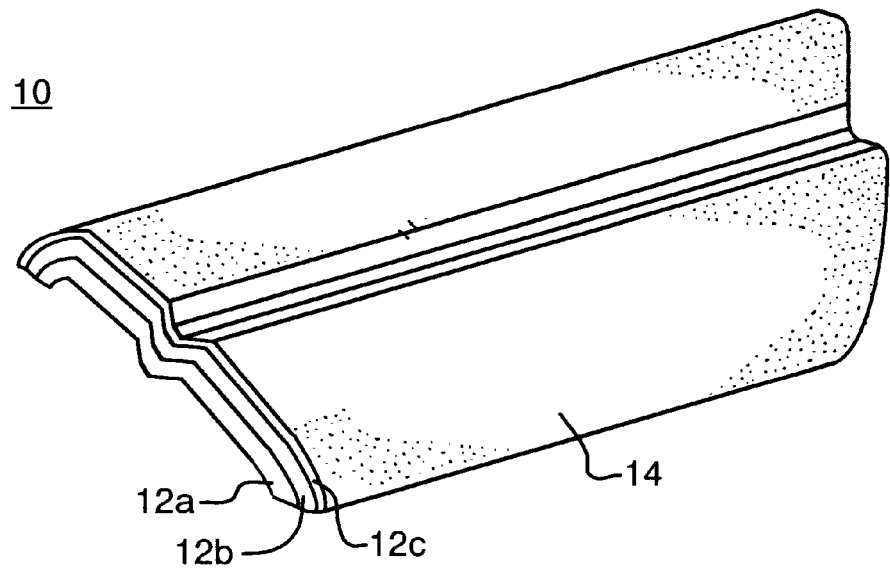
FIG. 1 is a schematic, perspective, cross-sectional view of a panel formed by a molded, multi-layer structure according to the method of the present invention.

The method according to one aspect of the present invention is used to form a molded, multi-layer structure 10, FIG. 1, such as headliners and panels in automobiles and other structures used in the automotive or building industries including bathtubs, counter tops, cabinets and the like. The molded, multi-layer structure 10 includes multiple layers 12a–c that are thermoformed into the desired shape. The type of materials for the layers 12a–c, including one or more thermoplastic materials, are selected to provide essentially any desired shape, physical characteristics, optical properties, and surface appearance or quality when the molded structure 10 is formed according to the method of the present invention. The molded, multi-layer structure can be formed with a varying thickness, varying rigidity, varying degrees of hardness/softness, and a textured or decorative surface 14 on at least one of the outermost layers 12c, as will be described in greater detail below.

Figure 2A:
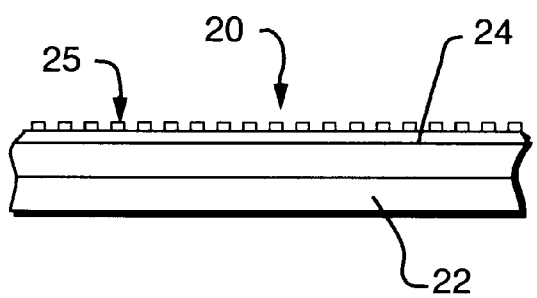
FIGS. 2A and 2B are side, cross-sectional views of pre-laminated, multi-layer structures, according to different embodiments of the present invention, prior to being thermoformed.
Figure 2B:
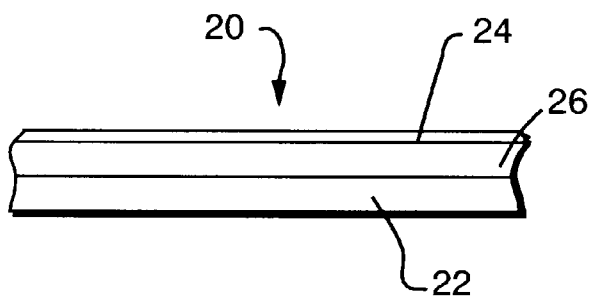

The starting material of the method according to one aspect of the present invention includes a pre-laminated, multi-layer structure 20, FIGS. 2A and 2B. The pre-laminated, multi-layer structure 20 includes at least one thermoplastic substrate layer 22 pre-laminated to at least one face or cover layer 24. In general, the thermoplastic substrate layer 22 is selected to provide desired rigidity, strength and other physical characteristics of the finished product. The cover layer 24 is, if possible, generally selected to provide the desired appearance or surface quality of the finished product but can also be selected based on physical characteristics. Additionally, the appearance or surface quality of the finished product can be later modified, generated or changed according to properties in the cover layer. When molded according to the method described below, the substrate layer 22 and cover layer 24 together provide a molded, multi-layer structure 10 having desired physical properties and appearance.

The pre-laminated, multi-layer structure 20 preferably has a uniform thickness, and according to one example, the thickness of the substrate layer 22 is in a range of about 1–25 mm and the thickness of the cover layer 24 is in a range of about 0.1–1 mm. The present invention contemplates various thicknesses for the layers 22, 24 in the pre-laminated structure 20 depending upon the desired physical characteristics of the molded structure 10.

The thermoplastic substrate layer 22 is preferably made of a thermoplastic foam, such as a polyolefin foam. The present invention contemplates thermoplastic foams having one or more polymers, including but not limited to, polyurethane, polyethylene, polypropylene, polyvinyl chloride (PVC), or any other suitable polymer. One example of a specific type of thermoplastic foam that can be used is ZOTE foam manufactured by Zote in Great Britain or Oletex in South Holland, or similar polyolefin foams provided by United Foam in Georgetown, Mass.

The preferred thermoplastic foam is partially cross-linked, for example, in a range of about 0 to 75% cross-linking. The degree of cross-linking in the thermoplastic foam of the substrate layer 22 is variable depending upon the desired rigidity or stiffness of the molded product after thermoforming, as described below. Thermoplastic foams with higher degrees of cross-linking have a higher degree of hardness or rigidity after thermoforming. Thermoplastic foams of lower degrees of cross-linking are softer and less rigid but will harden and become more rigid during heating and thermoforming by increasing the cross-linking. Thus, different types of foam or other thermoplastics having various degrees of cross-linking are selected to produce a molded product having the desired rigidity and hardness/softness or combination of these characteristics.

One way of providing partially cross-linked thermoplastic foams is to add a cross-linking agent to the polymer before extrusion such that the degree of cross-linking will vary with the amount of the cross-linking agent. Suitable cross linking agents include peroxide or other similar cross linking agents known to those skilled in the art. The present invention also contemplates other methods of cross linking thermoplastics.

Thermal cross-linking takes place by the reaction of the cross-linking agent with the polymer during the thermoforming process such that maintaining the thermoplastic at the thermoforming temperature increases the degree of cross-linking. By varying the temperature within a thermoplastic layer varying degrees of cross-linking are possible within the thermoplastic layer. The cross-linking agent reinforces, stabilizes and provides thermoset properties to the thermoplastic, for example, to inhibit softening when the substrate re-heated.

The cover layer 24 is selected to provide the desired appearance, surface quality and/or rigidity when combined and thermoformed with the substrate layer 22. The preferred embodiment includes a cover layer 24 made of a thermoplastic material compatible with that of the thermoplastic substrate layer 22, such as thermoplastics having the same polymers, allowing the molded, multi-layer structure 10 to be recycled. A cover layer 24 and substrate layer 22 made of the same or similar variations of the same polymer and fusion bonded or co-extruded without the use of an adhesive or other additives will be recyclable into a reusable thermoplastic without having to separate the layers. In one embodiment, the cover layer 24 is pre-formed with a desired appearance or texture, such as a grained surface 25.

Although thermoplastics are preferred for recyclability, the present invention contemplates cover layers 24 of virtually any material having the desired characteristics, such as rigidity, elasticity, texture, color, and the like. Other examples of cover layers 24 include, but are not limited to, cloth, carpets, post embossed thermoplastics, leather, or other elastic or formable films or covers suitable as cover stock.

One or more additional layers 26, FIG. 2B, can be optionally provided between the substrate layer 22 and the cover layer 24. According to one example, the thickness of the additional layer 26 is about 1–5 mm, although any thickness can be selected based upon the desired characteristics and use of the molded product. The material of the additional layer(s) 26 is also selected based upon the desired characteristics, such as thickness, hardness/softness, rigidity and the like, of the molded structure to be produced. A pre-laminated, multi-layer structure 20 with one or more additional layers 26 is capable of being thermoformed into an even wider variety of molded products.

For example, an additional layer 26 having a low degree of cross-linking or no cross-linking and a different density can be laminated to a substrate layer 22 having a higher degree of cross-linking such that the resulting molded, multi-layer structure will be rigid with a relatively soft or cushioned outer surface. All of the multiple layers 22, 24, 26 are preferably made of different variations (e.g. various degrees of cross-linking) of the same polymer to achieve the desired physical and aesthetic properties when combined, while also being recyclable.

The thermoplastic substrate layer 22 and cover layer 24 are pre-laminated using any conventional lamination process known to those skilled in the art. One preferred method of pre-laminating includes co-extruding the thermoplastic substrate layer 22 with the cover layer 24 such that the hot, extruded thermoplastic material of the substrate layer 22 fuses at the time of extrusion with the material of the cover layer 24. This co-extrusion process allows the substrate layer 22 and cover layer 24 to be pre-laminated without requiring an adhesive. A further method of laminating the layers 22 and 24 includes a flame lamination process where a flame is used to melt a surface of the thermoplastic material of the substrate layer 22 such that the cover layer 24 can be fusion bonded to the thermoplastic material of the substrate layer 22. The present invention, however, also contemplates pre-laminating the layers 22, 24 with conventional bonding adhesives known to those of ordinary skill in the art.

The pre-laminated, multi-layer structure 20 can be thermoformed to a desired shape after being heated to the required thermoforming temperature range sufficient for the multi-layer structure to be molded to a desired shape and to hold that shape upon cooling. In the exemplary embodiment using polyolefins, the thermoforming temperature is typically in a range of about 260° F. to 400° F. Other high temperature resistant thermoplastics, such as POLYSULFONE®, can be formed at temperatures in excess of 500° F. The pre-laminated multi-layer structure 20 is preferably heated such that heat is absorbed by the thermoplastic substrate layer until the thermoforming temperature is reached substantially uniformly throughout the thermoplastic substrate layer without exposing the outer regions or cover layer to excessive heat. The pre-laminated multi-layer structure can thereby be thermoformed without scorching or burning the outer regions of the multi-layer structure.

The preferred method of heating is by using infrared radiation having a predetermined wavelength selected to provide heat penetration and absorption substantially uniformly throughout the thermoplastic substrate layer 22. The pre-laminated, multi-layer structure 20 is preferably subjected to high output radiation having an off-peak wavelength that provides absorption just below or just above the maximum absorption for the thermoplastic. In the exemplary embodiment, the off-peak wavelength is in a range of about 1–2.5 microns or 3–5 microns.

The off-peak wavelength results in a lower heating temperature and prevents excessive absorption of radiation in the outer surfaces of the multi-layer structure 20, for example, causing the cover layer to be scorched or damaged. The off-peak radiation together with a high energy output allows a substantially uniform absorption of heat throughout the multi-layer structure in a reduced heating time. Accordingly, using high output radiation at an off-peak wavelength allows thermoforming of pre-laminated, multi-layer structures 20 having any desired shape, thickness, rigidity, texture, appearance, or any other desired physical or decorative characteristic without damaging the multi-layer structure during thermoforming.

According to one example, the infrared radiation is provided by a heat source having one or more heater banks on one or more sides of the multi-layer pre-laminated structure to allow the infrared radiation to penetrate the multi-layer pre-laminated structure. To achieve a high-energy output and provide a more uniform absorption of heat, substantially the entire heater bank surface radiates heat. The preferred heating method is described in greater detail by the inventor of the present application in the paper entitled *High Output Radiation at Off-Peak Wavelength-Infrared Heating of Low-Density Thermoplastics* (SAE Technical Paper Series), incorporated herein by reference.

The multi-layer structure is heated with the infrared radiation at least until the structure is thermoformable, for example, for about 20–90 seconds for a foam layer between ⅛ in. and 1 in. thick. The heating time can be increased to increase the degree of cross-linking in the cross-linkable thermoplastics and thereby vary the rigidity and hardness/softness of the thermoformed product.

Heating with infrared radiation at the off-peak wavelength accomplishes the desired heat absorption within the thermoplastic substrate layer in less time than conventional heating methods. The present invention, however, contemplates using conventional heating methods to uniformly heat the multi-layer structure to the thermoforming temperature substantially homogeneously throughout the structure, such as by convection heating.

Figure 3:
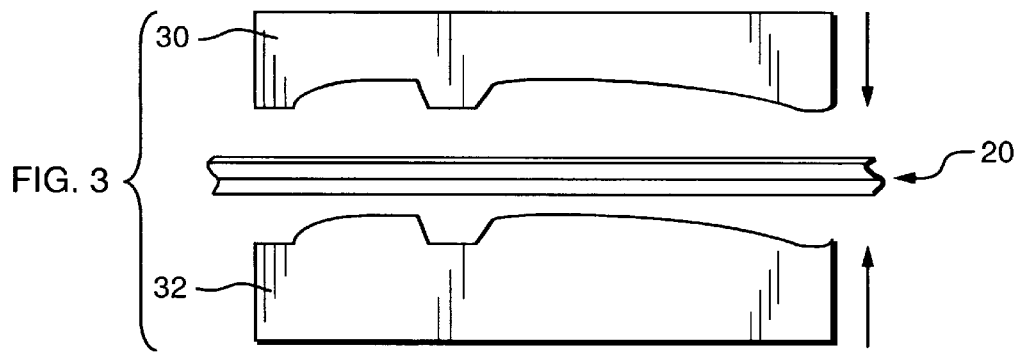
FIG. 3 is a side view of male and female molds for thermoforming the pre-laminated, multi-layer structure according to one embodiment of the present invention.

Heating the pre-laminated, multi-layer structure 20 to a substantially homogeneous thermoforming temperature allows the heated pre-laminated, multi-layer structure 20 to be molded to any shape, allows the thickness and rigidity of the pre-laminated structure 20 to be altered or varied, and allows various textured surfaces to be formed without being damaged by excessive heat. According to one method, male and female molds 30, 32, FIG. 3, are used, such as conventional clam shell molds known to those of ordinary skill in the art. The heated pre-laminated, multi-layer structure 20 is positioned between the male mold 30 and female mold 32. The male and female molds 30, 32 are forced against the heated pre-laminated, multi-layer structure 20 and sufficient pressure is applied to cause the heated pre-laminated, multi-layer structure 20 to conform to the shape of the molds 30, 32. During thermoforming, the molded structure can be further prepared such as by compressing the ends of the structure and folding over the edges while in the molds 30, 32. Other similar manufacturing steps can be performed during or after thermoforming.

Figure 4:
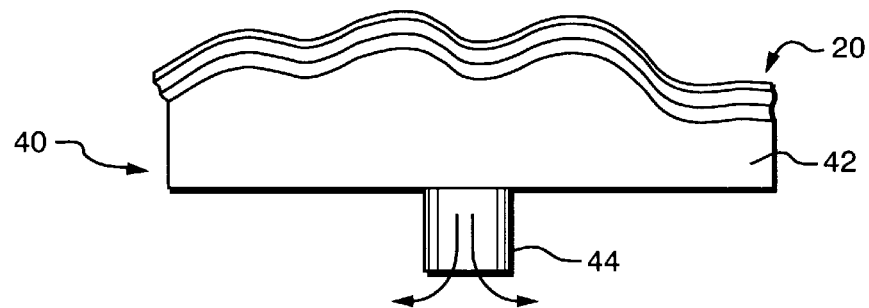
FIG. 4 is a side view of a vacuum mold for thermoforming the pre-laminated, multi-layer structure according to another embodiment of the present invention.

According to another method, a vacuum mold 40, FIG. 4, is used to mold the heated, pre-laminated, multi-layer structure 20. The heated pre-laminated, multi-layer structure 20 is placed on a vacuum mold member 42 having the desired shape. A vacuum providing device 44 causes the heated pre-laminated, multi-layer structure 20 to be vacuum drawn onto the vacuum mold member 42 and to conform to the shape of the vacuum mold member 42. Once the molded, multi-layer structure 20 has been sufficiently cooled to hold the desired shape of the vacuum mold member 42, the molded, pre-laminated structure 20 can be removed and further processed as described above.

Figure 5:
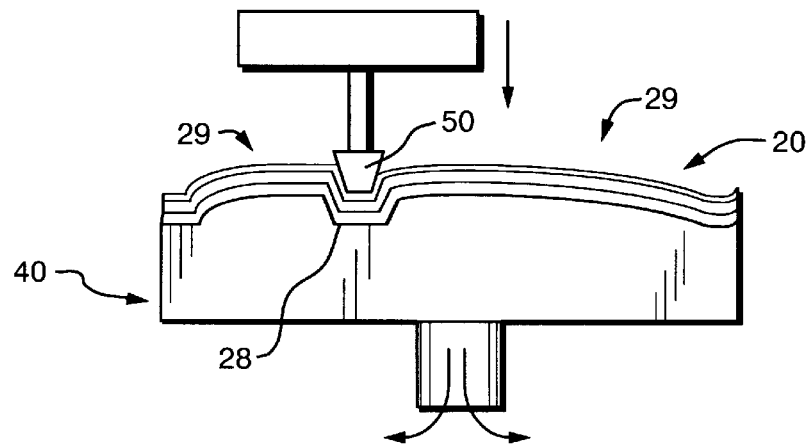
FIG. 5 is a vacuum mold and male plug for thermoforming and cover surface texturing of the pre-laminated, multi-layer structure into a molded, multi-layer structure having varying thickness according to a further embodiment of the present invention.

According to a further method, a male mold member or plug 50, FIG. 5, is used with a vacuum mold 40 to alter or vary the thickness of the heated pre-laminated, multi-layer structure 20 during thermoforming on the vacuum mold 40. The plug 50 applies pressure to the heated pre-laminated, multi-layer structure 20 causing a region 28 of lesser thickness and remaining regions 29 of greater thickness. This molding method also results in the regions 28 having increased rigidity or hardness and the regions 29 being softer or less rigid. Accordingly, in addition to allowing a pre-laminated, multi-layer structure 20 to be thermoformed to any desired shape, this method allows the thickness, rigidity and hardness/softness of the molded, multi-layer structure to be varied during the thermoforming process without requiring lamination of additional layers of material. The rigidity and hardness/softness of the molded structure is also determined by the thermoplastic material used in the pre-laminated structure, as described above, since the heating and thermoforming causes further cross-linking in the thermoplastic material.

Once the molded, multi-layer structure has sufficiently cooled to hold the shape of the mold, molded structure can be removed from the mold. Cooling is preferably accomplished through conductive cooling by lowering the temperature of the molds 30, 32, for example, to about 50 to 150° F., or through convective cooling with air at room temperature or slightly refrigerated by expanding compressed air. In a manufacturing process, the cooling temperature is typically set to match the cooling time with the heating time so that a molded, multi-layer structure can be removed from a mold to allow the next heated, pre-laminated, multi-layer structure 20 to be placed in the mold.

One or more surfaces of the mold members 30, 32, 42 in any of these methods can be formed with a textured surface, such as a pre-formed grain, that will mold a textured or grained surface into one or more surfaces (preferably the cover layer 24) of the heated, pre-laminated, multi-layer structure 20. Alternatively, the pre-laminated, multi-layer structure can have a textured or grained surface pre-formed into the cover layer 24, as described above.

Figure 6:
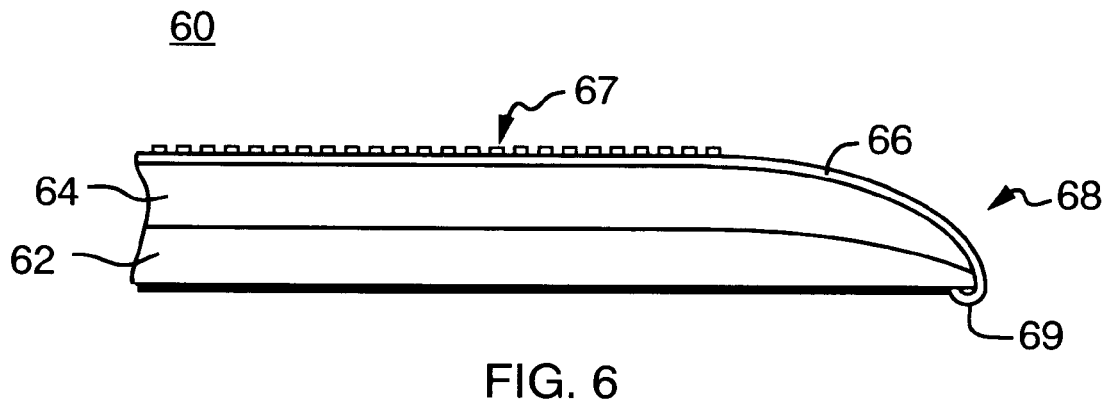
FIG. 6 is a cross-sectional view of a molded, multi-layer structure having tapered edges formed according to the present invention.

The method produces a molded, multi-layer structure 60, FIG. 6, having multiple layers 62, 64, 66 that have been formed to provide the desired physical characteristics and appearance. In one example, the cover layer 66 has a textured surface 67, the substrate layer 62 provides the desired rigidity, and the additional layer 64 provides the desired softness. One or more tapering edge portions 69 can be formed by varying the thickness of the substrate layer 62 and/or any additional layers 64 during thermoforming. Upon cooling, the molded, multi-layer structure 60 will hold the tapered shape. The molded structure 60 can also be formed so that an edge 69 of the cover layer 66 folds underneath the structure 60.

Figure 7:
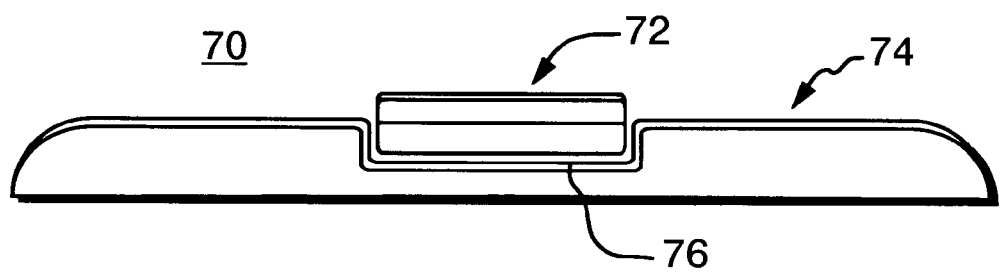
FIG. 7 is a cross-sectional view of a two-piece molded, multi-layer structure formed according to the present invention.

According to another example, a panel or structure 70, FIG. 7, is formed by combining a plurality of molded, multi-layer structures 72, 74 having different physical properties (rigidity, hardness/softness, shape) and appearances (textures, colors). One of the molded structures 74 is formed with a recessed region 76 by varying the thickness of the structure 74 during the thermoforming process. The other molded structure 72 can be mounted in the recessed region 76 to produce further variations of physical properties or appearances of the panel 70.

The method of the present invention can be used to form molded, multi-layer structures to suit essentially any desired usage. A pre-laminated structure is selected having the types of material needed to produce the desired physical characteristics and appearance. The pre-laminated structure is then formed into the desired product by molding the shape, varying the thickness and rigidity, and/or forming the textured surface during thermoforming. The uses for the molded, multi-layer structures produced according to the method of the present invention include, but are not limited to, panels in automobiles, aircrafts, sinks, bathtubs, cabinets, tables, chairs, and any other uses in the automotive and building industry.

Accordingly, the method of the present invention allows a molded, multi-layer structure to be thermoformed from a pre-laminated, multi-layer structure in a more efficient and less expensive manner by substantially uniformly heating the pre-laminated, multi-layer structure to a substantially homogenous thermoforming temperature. The method allows any desired surface texture to be pre-formed into the pre-laminated, multi-layer structure or formed during thermoforming without damaging the textured surface. Moreover, the method allows the thickness and rigidity of the molded structure to be varied during the thermoforming stage without requiring additional layers of various types of material or additional complex manufacturing equipment. The present method also allows molded, multi-layer structures to be formed from the same type of thermoplastic materials so that the final product can be recycled into a reusable plastic without separating the various layers of the molded structure.

Modifications and substitutions by one of ordinary skill in the art are considered to be within the scope of the present invention which is not to be limited except by the claims which follow.

What is claimed is:

1. A method of forming a molded, multi-layer structure, said method comprising the steps of:

provising a pre-laminated, multi-layer structure including at least a substrate layer, an additional layer, and a cover layers wherein said substrate layer is made of a partially cross-linked thermoplastic material, and wherein said additional layer is made of a thermoplastic material having a lower degree of cross-linking than said partially cross-linked thermoplastic material of said substrate layer;

heating said pre-laminated, multi-layer structure with high output infrared radiation at an off-peak wavelength in a range of about 1–2.5 microns or 3–5 microns, for raising a temperature of said pre-laminated, multi-layer structure to a thermoforming temperature substantially homogeneously throughout said pre-laminated, multi-layer structure until said pre-laminated, multi-layer structure is in a thermoformable state; and forming said heated pre-laminated, multi-layer structure into said molded, multi-layer structure, wherein said heating causes increased cross-linking in each said substrate layer and said additional layer such that said additional layer is softer than said substrate layer in said molded, multi-layer structure.

2. The method of claim 1 wherein said pre-laminated, multi-layer structure is formed by bonding said substrate layer, said additional layer, and said cover layer with an adhesive.

3. The method of claim 1 wherein said pre-laminated, multi-layer structure is formed by fusion bonding said substrate layer, said additional layer, and said cover layer.

4. The method of claim 1 wherein said pre-laminated, multi-layer structure is formed by co-extruding said substrate layer, said additional layer, and said cover layer.

5. The method of claim 1 wherein said cover layer is made of a thermoplastic material, and wherein said thermoplastic materials of said substrate layer, said additional layer, and said cover layer include the same polymers.

6. The method of claim 1 wherein said substrate layer is made of a partially cross-linked polyolefin foam.

7. The method of claim 5 wherein said substrate layer, said additional layer, and said cover layer include polymers selected from the group consisting of polyurethane, polyethylene, polypropylene, and polyvinyl chloride.

8. The method of claim 1 wherein forming said heated pre-laminated, multi-layer structure into said molded, multi-layer structure includes placing said heated pre-laminated, multi-layer structure between male and female mold members, and pressing said male and female mold members against said heated pre-laminated, multi-layer structure.

9. The method of claim 1 wherein forming said heated pre-laminated, multi-layer structure into said molded, multi-layer structure includes placing said heated pre-laminated, multi-layer structure against a vacuum mold member, and vacuum molding said heated pre-laminated, multi-layer structure.

10. The method of claim 1 wherein forming said heated pre-laminated, multi-layer structure into said molded, multi-layer structure includes forming said heated pre-laminated, multi-layer structure with at least one region of varying thickness.

11. The method of claim 1 wherein forming said heated pre-laminated, multi-layer structure into said molded, multi-layer structure includes forming at least one region of varying hardness.

12. The method of claim 1 wherein forming said heated pre-laminated, multi-layer structure into said molded, multi-layer structure includes forming a textured surface on said cover layer.

13. The method of claim 1 wherein said cover layer includes a textured surface pre-formed onto said cover layer.

14. A method of forming a molded, multi-layer structure, said method comprising the steps of:

providing a pre-laminated, multi-layer structure including at least first and second thermoplastic layers, wherein said first thermoplastic layer is made of a partially cross-linked thermoplastic foam, and wherein said second thermoplastic layer is made of a thermoplastic foam having a lower degree of cross-linking than said partially cross-linked thermoplastic foam of said first thermoplastic layer;

subjecting said pre-laminated, multi-layer structure to high output infrared radiation at an off-peak wavelength in a range of about 1–2.5 microns or 3–5 microns, for providing heat penetration and absorption substantially uniformly throughout said pre-laminated, multi-layer structure until said pre-laminated, multi-layer structure is in a thermoformable state; and forming said heated pre-laminated, multi-layer structure into said molded, multi-layer structure, wherein said heat penetration and absorption causes increased cross-linking in each of said first and second thermoplastic layers such that said second thermoplastic layer is softer than said first thermoplastic layer in said molded, multi-layer structure.

15. The method of claim 14 wherein said first and second thermoplastic layers include the same polymers.

16. The method of claim 14 wherein said first and second thermoplastic layers include polyolefin foam.

17. The method of claim 14 wherein forming said heated pre-laminated, multi-layer structure into said molded, multi-layer structure includes forming said heated pre-laminated, multi-layer structure with at least one region of varying thickness.

18. The method of claim 14 wherein said pre-laminated, multi-layer structure further includes a cover layer pre-laminated over at least one of said first and second thermoplastic layers.

* * * * *